United States Patent [19]

Igarashi

[11] Patent Number: 5,045,967
[45] Date of Patent: Sep. 3, 1991

[54] MULTI-COLOR IMAGE FORMING APPARATUS

[75] Inventor: Masaru Igarashi, Yokohama, Japan

[73] Assignee: Canon Kabushiki Kaisha, Tokyo, Japan

[21] Appl. No.: 179,263

[22] Filed: Apr. 8, 1988

[30] Foreign Application Priority Data

Apr. 15, 1987 [JP] Japan .................. 62-090977

[51] Int. Cl.⁵ .............................. G06F 15/20
[52] U.S. Cl. .................... 364/518; 364/519
[58] Field of Search ............ 364/518, 519, 521; 340/703, 721, 723

[56] References Cited

U.S. PATENT DOCUMENTS

| 4,520,358 | 5/1985 | Makino | 340/799 |
| 4,564,915 | 1/1986 | Evans et al. | 364/521 |
| 4,590,463 | 5/1986 | Smollin | 340/703 |
| 4,635,048 | 1/1987 | Nishi et al. | 340/703 |
| 4,694,288 | 9/1987 | Harada | 340/721 |
| 4,811,281 | 3/1989 | Okamoto et al. | 364/900 |
| 4,813,013 | 3/1989 | Dunn | 364/900 |

FOREIGN PATENT DOCUMENTS

| 0008324 | 3/1980 | European Pat. Off. |
| 0180021 | 5/1986 | European Pat. Off. |
| 3244653 | 7/1983 | Fed. Rep. of Germany |
| 3433868 | 4/1985 | Fed. Rep. of Germany |

Primary Examiner—Heather R. Herndon
Attorney, Agent, or Firm—Fitzpatrick, Cella, Harper & Scinto

[57] ABSTRACT

A multi-color image forming apparatus includes a first memory for storing a plurality of image data together with corresponding color data. An output device is provided for outputting image data onto an output medium. A designation device is provided for designating desired ones of the plurality of image data stored in the first memory and positions on the output medium at which the designated image data are to be output. A plurality of second memories are provided, each storing designated image data for a different color. Control circuitry controls the output device and the plurality of second memories to output the designated image data at their respective positions and in their separate colors on the output medium.

9 Claims, 16 Drawing Sheets

FIG.12

| 1401 | 1402 | 1403 |
|---|---|---|
| FORM PATTERN SET ID | FORM PATTERN SET LEAD ADR | FORM PATTERN SET SIZE |
| | | |
| | | |
| | | |
| | | |

MULTI-COLOR IMAGE FORMING APPARATUS

BACKGROUND OF THE INVENTION

1. Field of the Invention

The present invention relates to a multi-color image forming apparatus and, more particularly, to an image forming apparatus to form an image such that the registered image is reproduced in a desired color.

2. Related Background Art

In an image forming apparatus, for example, in a conventional printer or the like, characters are printed on the basis of print data or a print instruction which is transmitted from a host computer. However, in recent years, characters are expressed by sets of dots. Therefore, not only characters but also arbitrary shapes can be expressed and an image can be also printed.

FIG. 2 shows an example of the print. Reference numerals 201, 204, and 205 denote images, 206 indicates a ruled line, and the others represent characters. Since characters and images are also constituted by dots, by sequentially transmitting dot information by an amount of one line or one page from an external host computer connected to the printer, the print example of FIG. 2 can be obtained.

However, according to this system, a quantity of data which is transmitted between the host computer and the printer is very large. Therefore, by providing a character generator for the printer, the character data to be transmitted is reduced.

Further, the assignee of this invention also has proposed a technique such that after an image was also once registered as an image pattern in the image forming apparatus, by merely sending an image identifier to the image forming apparatus without directly sending the image pattern thereto, the image pattern can be also printed.

However, the foregoing conventional technique and the proposed technique relate to an image forming apparatus which prints in one color. Therefore, for example, in FIG. 2, if an operator wants to print the characters such as an image 202 and the like in "black" and the logos 201 and 205 in "red", a (preprinted) paper on which those logos have previously been printed must be used because the same image forming apparatus cannot print in two colors.

SUMMARY OF THE INVENTION

It is the first object of the present invention to provide a multi-color image forming apparatus in which in an image which is output and reproduced, a portion of a registered image is output in the color designated by color designating means and this color can be arbitrarily set by designation.

The second object of the invention is to provide a multi-color image forming apparatus in which the image which has previously been registered is formed in a color different from the color of another output image, e.g., an output image such as character data or the like.

The third object of the invention is to provide a multi-color image forming apparatus comprising: a registered image memory to previously store a plurality of predetermined images such that they can be searched; input means for inputting images; designating means for designating at least one of the registered images, for designating an output position of this image, and for designating a color to be output; and control means for controlling the apparatus such that the output position of the image designated from among the registered images overlaps the designated position in the output space of the image which is input by the input means.

BRIEF DESCRIPTION OF THE DRAWINGS

FIG. 12 is a diagram showing a structure when a plurality of form pattern sets are stored.

DETAILED DESCRIPTION OF THE EMBODIMENTS

Embodiments of the present invention will be described in detail hereinbelow with reference to the drawings. The embodiments include the first embodiment in which a color is designated by an instruction from a host computer arranged outside of a multi-color image forming apparatus and the second embodiment in which a color is designated from a keyboard panel provided in the multi-color image forming apparatus. The first embodiment will be first explained.

FIRST EMBODIMENT

Arrangement

Figure 1:
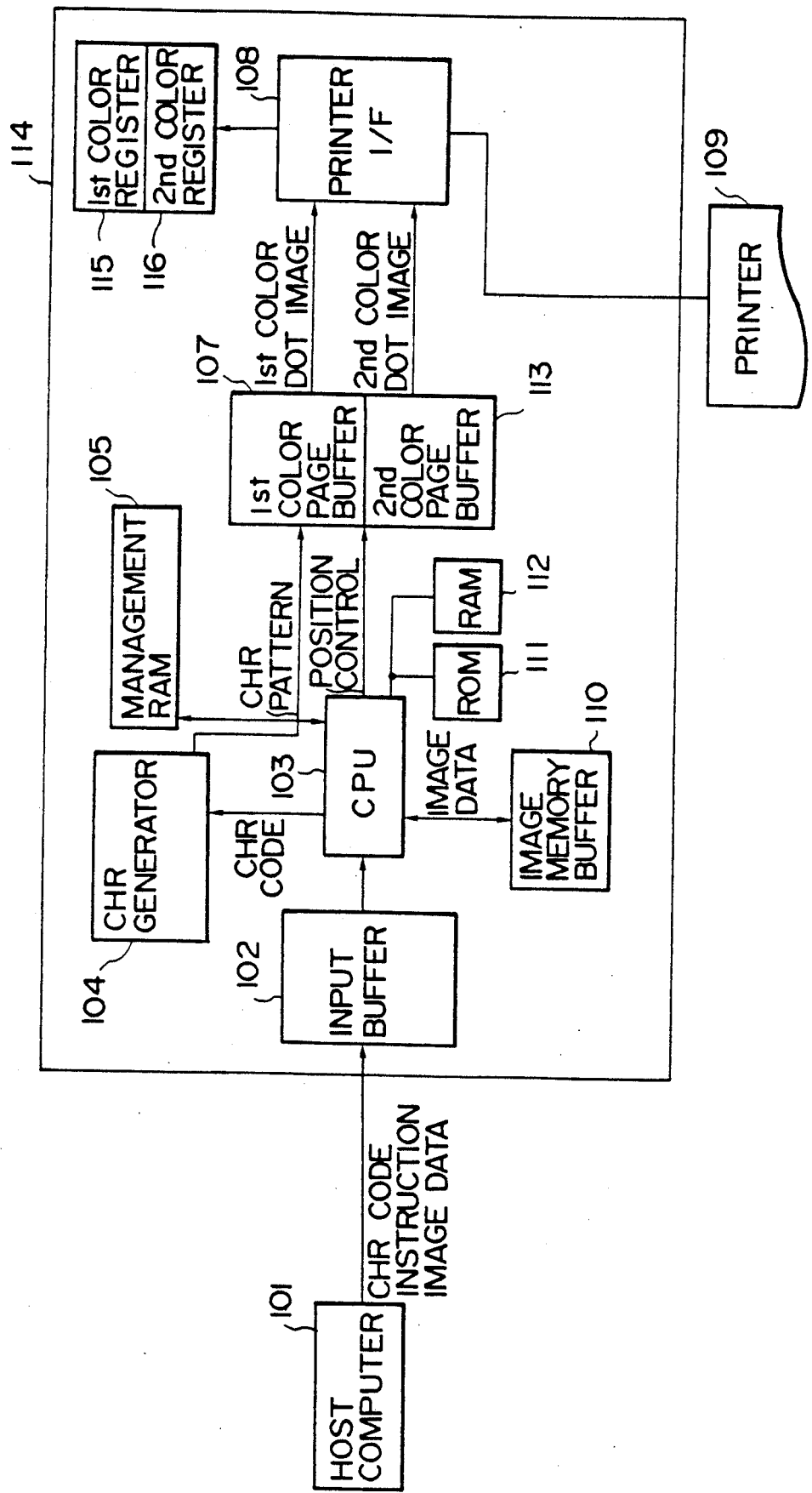
FIG. 1 is a block arrangement diagram of a multi-color image forming apparatus in a first embodiment.

FIG. 1 is a block diagram of a multi-color image forming apparatus of the first embodiment. Reference numeral 101 denotes a host computer to send image data, instructions, and the like to the apparatus; 102 indicates an input buffer to store the data or the like received from the host computer 101; 103 is a CPU to control the apparatus in the first embodiment; 111 is a ROM to store processing programs of the CPU 103; 112 is a RAM for auxiliary storage; 104 is a character generator provided in the apparatus; 105 is a management RAM to store the information to search and manage the registered images; and 110 is a image memory buffer to store the image data of the registered images as dot images.

Reference numeral 107 denotes a page buffer having a capacity to store dot patterns of one page. The page buffer 107 outputs the registered image in a first color. A page buffer 113 likewise outputs the registered image in a second color. A printer 109 performs the typing or printing operation and has the capability of a plurality of colors. The signal transmission and reception with the printer 109 are performed through a printer interface 108. The above components are provided on a control board 114.

Information indicative of the kind of color in which the printing can be performed at present by the printer 108 is stored as a code in registers 115 and 116. This code is sent through the printer interface 108. This code is predetermined. For example, when image data can be printed in "black", the code is set to "0". In the case of printing in "red", the code is set to "1". In the first embodiment, each of the registers 115 and 116 stores a code regarding a separate color. However, if the printer 109 has a multi-color printing function, an arbitrary number of color codes can be set by increasing the number of registers.

There are the following relations among the page buffers 107 and 113, the registers 115 and 116, and the printer 109. Namely, the printer 109 has developing systems (e.g., developers 805 and 806 in FIG. 8) for two colors. These two developing systems are coupled with the page buffers 107 and 113 in a one-to-one corresponding relation. For example, the image expanded in the page buffer 107 of the first color is certainly developed by the developer 805. The image expanded in the page buffer 113 of the second color is surely developed by the developer 806. The developers 805 and 806 are detachable, so that the color can be changed. Therefore, in order to know in which color the print out can be performed at present, the registers 115 and 116 are provided.

Figure 2:
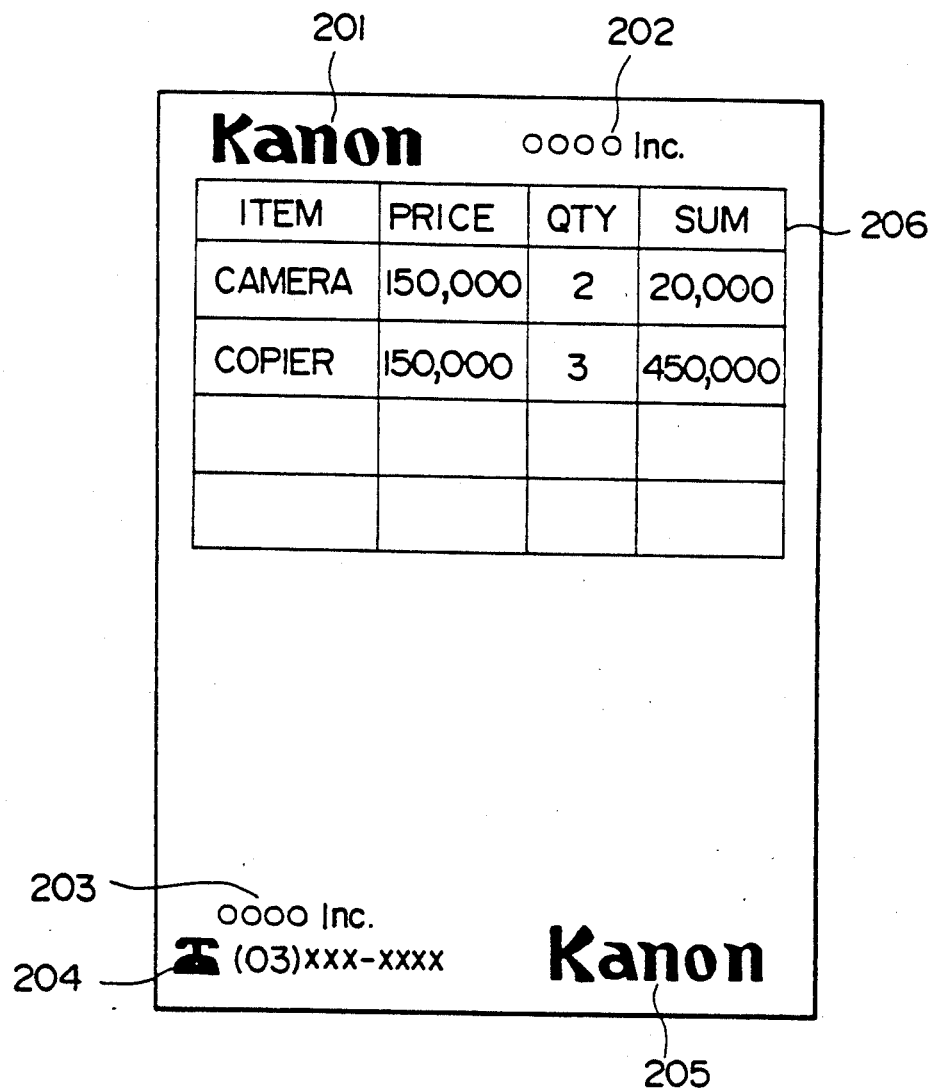
FIG. 2 is a diagram showing a sample of print.

With this arrangement, the operation will now be schematically explained. When the image shown in FIG. 2 is output to the printer 109, it is assumed that the images 201, 204, and 205 are printed in, e.g., "red" and the other characters and ruled line portions are printed in, e.g., "black". On the other hand, the printer 109 has the red and black developing systems so as to print in at least two colors of "red" and "black". Therefore, to signify the printing color, the code "0" is stored in the first color register 115 and the code "1" is stored in the second color register 116. The images such as characters or the like must be expanded in the page buffer 107. The image 201 and the like must be expanded in the page buffer 113.

Schematic explanation of the operation

First, it is necessary to register the images 201, 205, 204 in the image memory buffer 110. The registration denotes that not only the above image data are stored as image patterns in the buffer 110 but also the identifier ID and color are assigned to each of the stored image patterns and registered. After the image data were once registered, by merely using the identifier ID, the image corresponding to this ID is expanded in the page buffer 107 or 113 of the color designated for the registered image.

The images 202 and 206, etc., are input as forms of character codes or the like to the input buffer 102 from the host computer 101 and analyzed by the CPU 103. Further, the input images are converted into the dot images in accordance with the character generator 104 and expanded into the first color page buffer 107 (to print in black). Next, the image 201 or the like is input together with the identifier ID and the address information indicative of the address for expansion in the page buffer 113. From the identifier ID, the CPU 103 reads out the image having this ID from the buffer 110 on the basis of the information in the management RAM 105 and expands it in the second color page buffer 113. The images expanded in these two page buffers are printed in two colors under the control of the CPU 103 and printer interface 108. That is, since the printer interface 108 can know in which color the printer 109 can print at present on the basis of the contents of the registers 115 and 116, the contents of the page buffers 107 and 113 can be printed in the colors designated upon registration. In this manner, the images which have previously been registered can be printed in predetermined colors.

Control instruction

Figure 3:
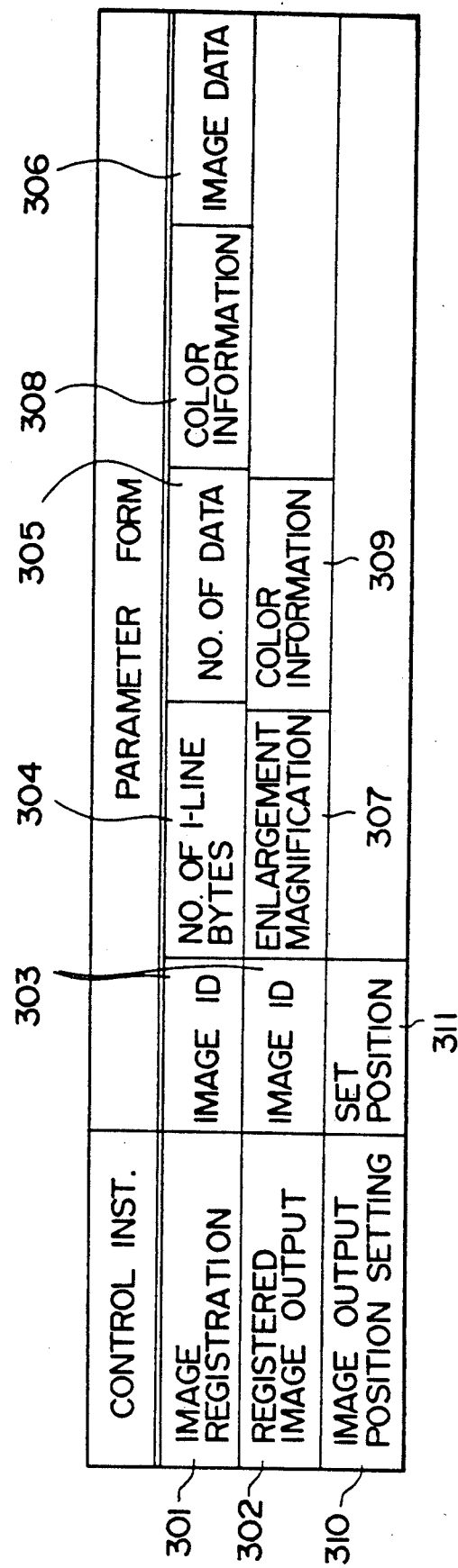
FIG. 3 is a diagram showing a format of control instructions.
Figure 4:
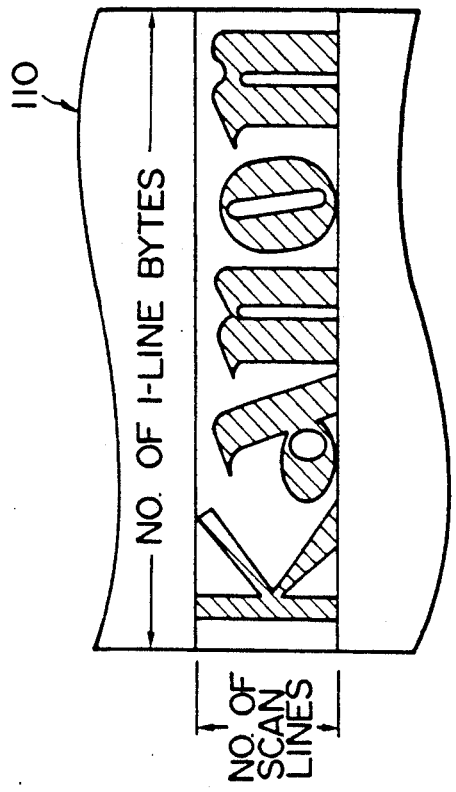
FIG. 4 is a diagram showing an example of image data of a registered image.

A detailed explanation will be further made hereinbelow. FIG. 3 is a table showing kinds and formats of control instructions which are used by the host computer 101 in the apparatus of the first embodiment. In FIG. 3, among a number of control instructions, there are shown an image registration instruction, a registered image output instruction, and an image output position setting instruction which are particularly concerned with the first embodiment. FIG. 4 shows image data stored in the image memory buffer 110 with respect to the registered image 201 (or 205) shown in FIG. 2.

An image registration instruction 301 comprises five fields consisting of an image ID field 303, a number of 1-line bytes (image width) field 304, a number of data field 305, a color information field 308, and an image data field 306. The image ID of the field 303 is the identifier ID of the image to be registered. The number of 1-line bytes field 304 represents the number of bytes in the lateral direction of the image registered as shown in FIG. 4. The number of data field 305 indicates the data amount of the whole image data (dot images) to be registered. The image data is input as a field 306 from the host computer 101 to the input buffer 102 subsequent to the registration instruction.

Management information

Figure 5:
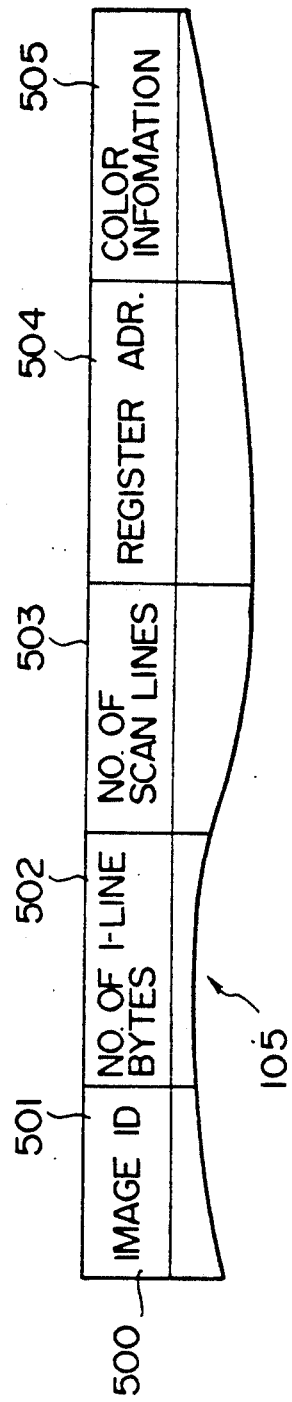
FIG. 5 is a diagram showing a table structure in a management RAM 105.

FIG. 5 shows how to write the management information of the registered image into the management RAM 105. Reference numeral 500 denotes one entry of the registered image. One entry comprises five fields consisting of an image ID field 501, a number of 1-line bytes field 502, a number of scan lines field 503, a register address field 504, and a color information field 505. The image ID in the field 501 corresponds to the image ID (field 303) of the registration instruction which is transferred from the registration instruction upon registration. Likewise, the field 504 corresponds to the content of the field 304 of the registration instruction which is transferred therefrom upon registration. The color information in the field 505 corresponds to the color information in the field 308 which is transferred therefrom upon registration. The number of scan lines in the field 503 is the number of lines in the vertical direction which is obtained by the CPU 103 by calculating on the basis of the number of data in the field 305 and the number of 1-line bytes in the field 304 upon image registration. The register address in the field 504 is the register address of the registered image in the memory buffer 110.

Registration processing procedure

Figure 6:
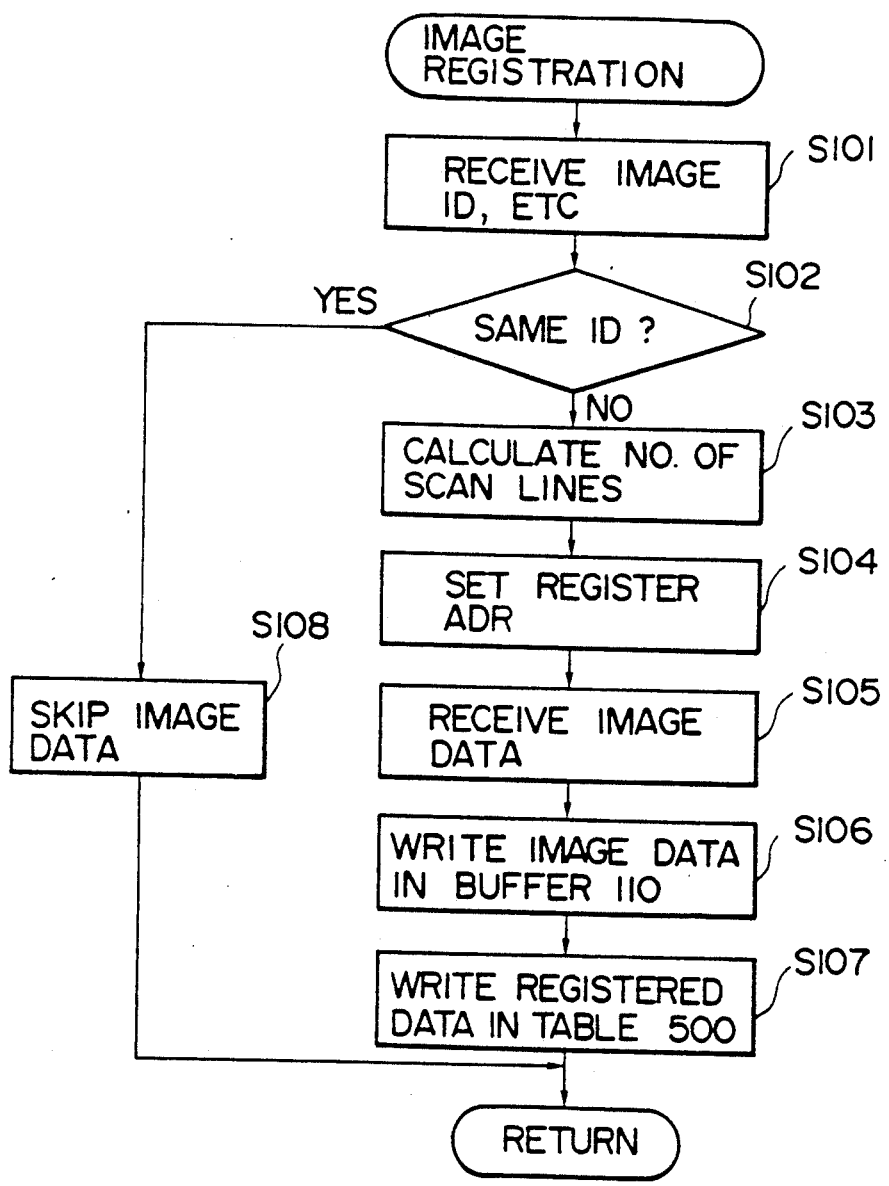
FIGS. 6 and 7 are processing flowcharts for a multi-color image forming apparatus in the first embodiment.

An explanation will now be made in accordance with processing programs of the first embodiment stored in the ROM 111 shown in FIGS. 6 and 7. First, the processing procedure for image registration shown in FIG. 6 will be explained. In the main routine of the CPU 103, when it is determined that the instruction input to the input buffer 102 is the image registration instruction, this procedure is taken out as a subroutine from the main routine. In step S101, the respective fields of the image registration instruction 301 are input to the input buffer 102 and analyzed. In step S102, a check is made to see if the same image ID has already been registered in the image memory buffer 110 or not. For this purpose, the image ID in the field 303 of the registration instruction and the image ID in all of the fields 501 stored in the management RAM 105 are compared and searched.

If the same image ID has already been registered, there is no need to write it into the memory buffer 110. Therefore, the processing routine advances from step S102 to step S108 and the image data in the field 306 which is transmitted after the registration instruction is skipped by only the number of data 305.

If the same image ID is not registered yet, the image ID 303 is newly registered in steps S103 to S107. The registering procedure at this time will now be explained hereinbelow.

The number of 1-line bytes in the field 502 corresponds to the number of 1-line bytes in FIG. 3 and is expressed on a byte unit basis. The number of data in the field 305 is equal to the product of the number of 1-line bytes in the field 304 and the number of scan lines in the field 503. Therefore, in step S103, by dividing the number of data by the number of 1-line bytes, the number of scan lines is obtained. The number of scan lines indicates the height of the image in FIG. 4. In step S104, the head address in the image memory buffer 110 into which the image data is written is set as the register address. In step S105, the image data in the field 306 is received. In step S106, the image data is sequentially written into the image memory buffer 110 from the register address position. In step S107, the registration data (image ID, number of 1-line bytes, number of scan lines, register address, color information) are written into the image data management table 500 in the management RAM 105. As mentioned above, the registration image data is formed in the management RAM 105 in a format of FIG. 5 as mentioned above. The actual image data is stored in the memory buffer 110.

Printing of registered image

When the image of FIG. 2 is printed, it is necessary to first print the image 201. It is assumed that the image 201 and the like have already been registered by the foregoing registering processes.

When the registered image is printed, the registered image output instruction is used. The image data of FIG. 4 has already been registered in the memory buffer 110 by the method shown in FIG. 6. The data which is first sent from the host computer 101 is the image output position setting instruction (FIG. 3) indicative of the printing position. When the image 201 in FIG. 2 is output, the leftmost address in the image 201 is located in the field 311 of the relevant instruction.

Next, the registered image output command is transmitted from the host computer 101. In the main routine for the control of the CPU 103, when the CPU 103 analyzes the instruction in the input buffer 102 and recognizes that it is the registered image output instruction, the subroutine in FIG. 7 is taken out.

As shown in FIG. 3, the output instruction comprises the image ID field 303, a field 307 to store an enlargement magnification of the registered image which is magnified and output, and a color information field 309 to designate the color to be output. The enlargement magnification is expressed by %. In the case of the enlargement of ½ time, the magnification is expressed by "50". In the case of the enlargement of two times, the magnification is expressed by "200". The color information in the field 309 of the registered image output instruction is not necessarily made coincident with the color information which is designated by the image registration instruction and registered in the field 505 in the management RAM 105. By enabling the color which is output by the registered image output instruction to be freely designated, a degree of freedom of the image output program is increased. Therefore, if an operator wants to output in the same color as the registered color, the color information in the field 309 can be also omitted.

Figure 7:
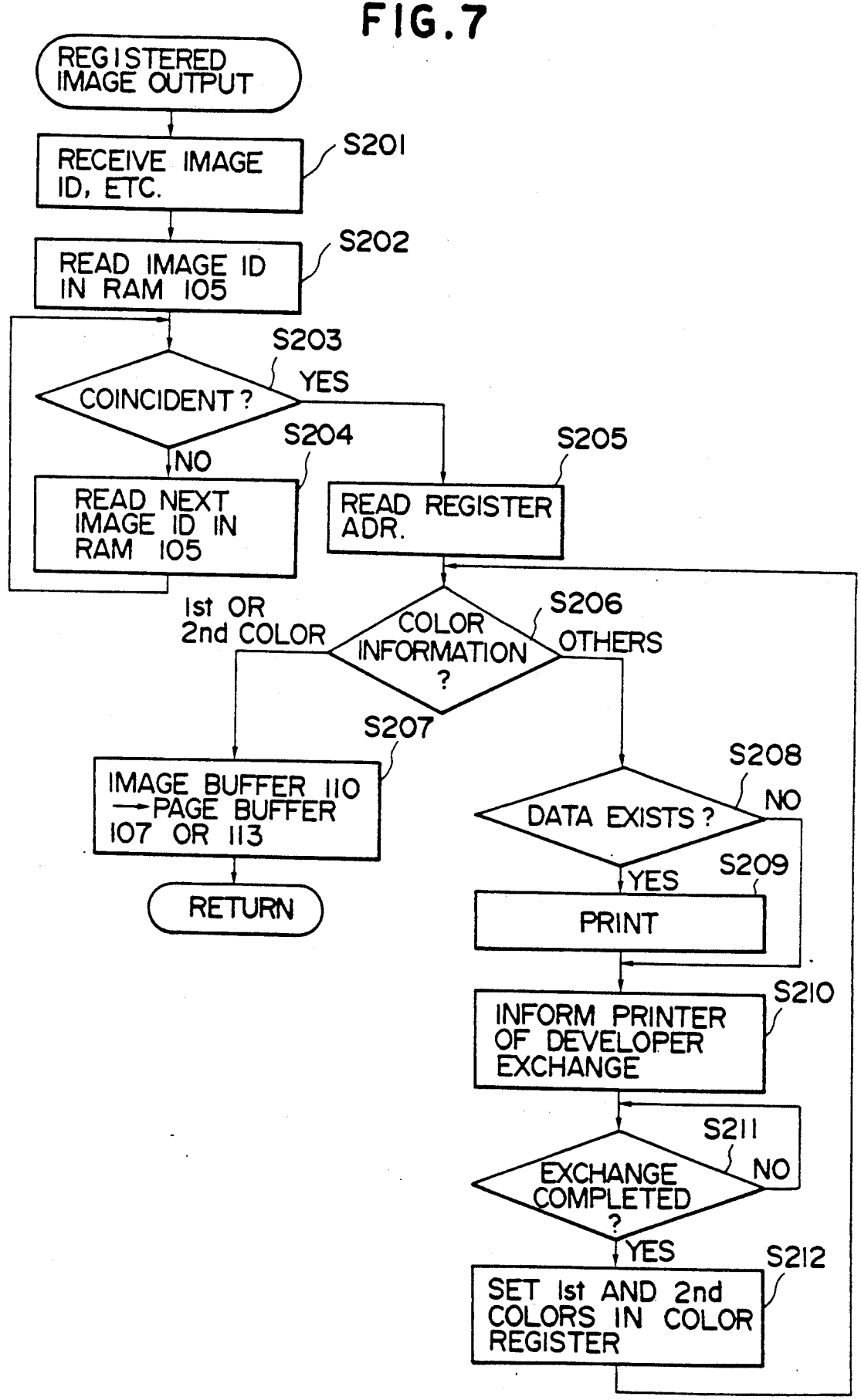

In this manner, the process in step S201 in FIG. 7 is taken out. Further, when the respective fields of the registered image output instruction are sent from the host computer 101, the CPU 103 searches to see if the image ID which coincides with the image ID in the field 303 of this instruction exists in the management RAM 105 or not in steps S202 to S204. If the coincident image ID was found out, step S205 follows. In step S205, the register address of the image in the field 504 is read out of the RAM 105.

In the next step S206, the color information in the field 309 of the output instruction is checked. This is because if the color information exists in the instruction, the image data is preferentially output in this color. On the other hand, as mentioned above, if the field 309 is not designated in the instruction, it is determined that the operator wants to output in the color which has already been registered. Therefore, the color information in the field 505 in the image data management table 500 is referred to. That is, in step S206, the color information designated by the instruction or the color information of the registered image, the code in the first color register 115, and the code in the second color register 116 are compared. As mentioned above, the codes of the colors (in this case, two colors) which can be printed at present by the printer are stored in these two registeres.

In step S206, if the color in which the registered image is output is either the first color or the second color, step S207 follows. In step S207, if the color to be output is the first color, the page buffer 107 is selected. If it is the second color, the page buffer 113 is selected. In the page buffer is selected, the registered images in the image memory buffer 110 are sequentially read out and written in accordance with the order from the output positions designated by the image output position instruction. At this time, the registered images are sequentially read out from the position of the register address read out in step S205. The image data equal to the number of 1-line bytes (corresponding to one scan) in the field 502 is copied to the page buffer selected. After completion of the copying operation of the image data of one scan line, the address pointers of the page buffer to be output are moved to the start position of the image on the next scan line by adding the number of 1-line bytes in the field 502. The image data is transferred by only the amount of the number of 1-line bytes of the next scan line. In this manner, the image data is copied until the last scan line and step S207 is finished.

The processing routine is returned to the main routine from step S207. Although not shown in the main routine, the image stored in the page buffers 107 and 113 are output to the printer 109 in accordance with the colors assigned to the page buffers. When the operator wants to output the same image as the image which has already been registered, by merely sending simple information such as the image ID or the like of the registered image, this image is reproduced. Further, only the registered image can be output in the reproduction color which is substantially equal to a desired color. The image 205 (FIG. 2) is also copied to the output page buffer in a manner similar to the above.

In the discriminating step S206, if it is determined that the color to be output (the color information in the field 309 or 505) is different from the color set in the color register 115 or 116, the registered images cannot be written into both page buffers. Therefore, the processing routine advances from step S206 to step S208 and a check is made to see if the other images (in FIG. 2, the images 202, 206, and the like) excluding the registered images have already been expanded in the corresponding page buffer or not. When the image of FIG. 2 is output, since the image 201 is first written into the buffer, if it is known that the color of the image 201 is not set in the printer 109, the other character images or the like are not expanded in the page buffer.

In the case of outputting the image 205, if the character images 202 or the like have already been expanded in the page buffer, in step S209, the dot data of this image stored in the present page buffer is sent to the printer 109 through the printer interface 108. The printer 109 outputs the image other than the registered images in the color corresponding to each page buffer.

On the contrary, if no image other than a registered image is expanded in step S208, there is no need to print, so that step S210 follows. In step S210, to inform the operator of the fact that the developer of the printer 109 needs to be exchanged, an instruction to indicate this message is provided to the printer 109 through the printer interface 108. In step S211, a check is made to see if the developer has been exchanged or not by communicating with the printer 109. After completion of the exchange, in step S212, the color information of the present printer after the developer was exchanged is provided from the printer 109 and this color code is set into the color register 115 or 116. At this stage, in order to output a desired registered image in a desired output color, the developer of this color is set into the printer 109 and this color code is set into the color register. Returning now to step S206, the foregoing flow is repeated. That is, at this time point, since the developer has been exchanged so as to output the registered image in the colors of the color codes set in the registers 115 and 116, the foregoing procedure is executed in step S207 and the registered images are printed.

Printing apparatus

Figure 8:
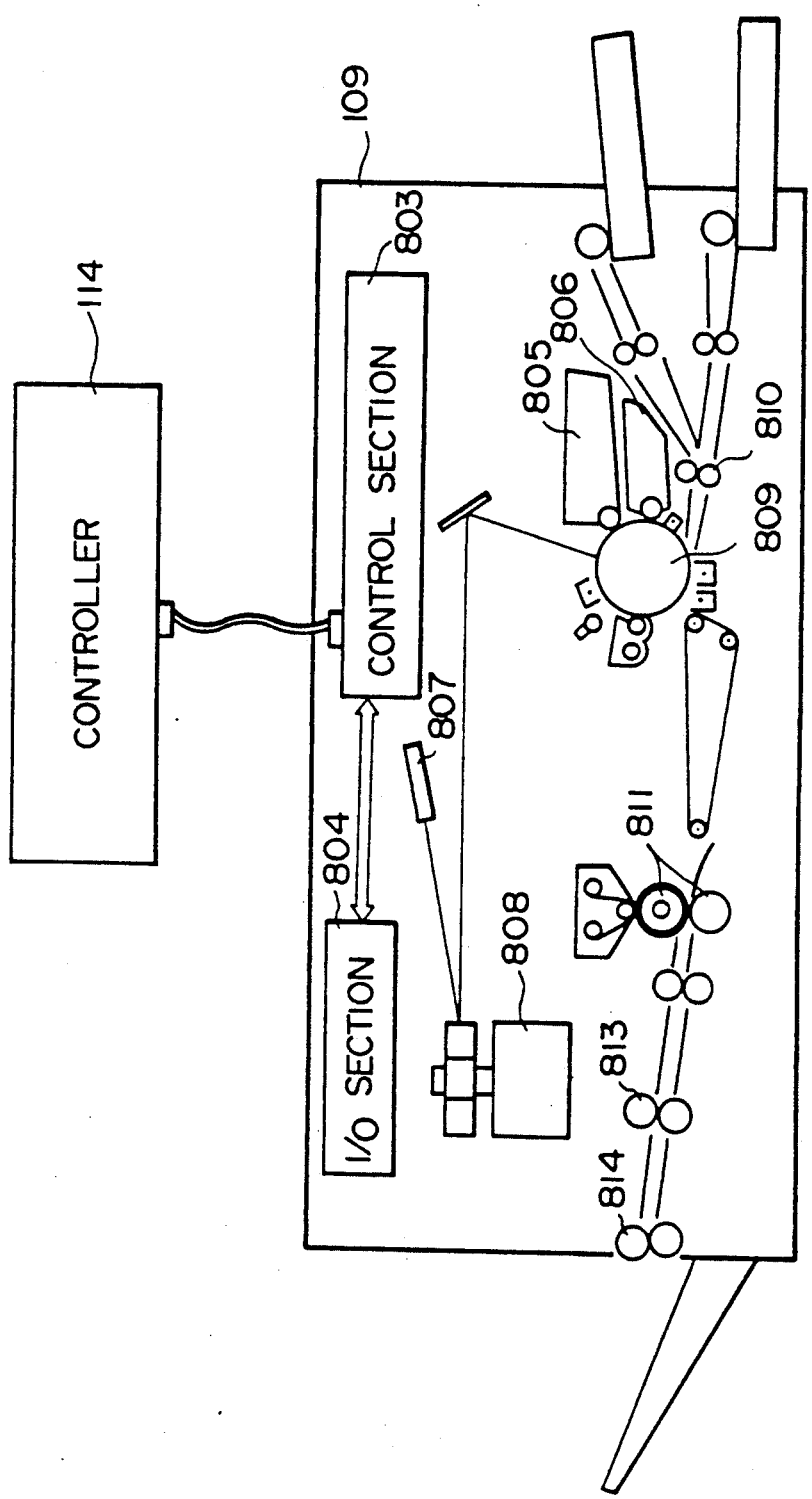
FIG. 8 is a diagram showing the inside of a laser beam printer which can be applied to the image forming apparatuses in the first and second embodiments.

FIG. 8 is a cross sectional view showing an internal structure of a laser beam printer (hereinafter, referred to as an LBP) as a further practical example of the printer 109 in the first embodiment.

In FIG. 8, reference numeral 114 denotes the controller to output an operation instruction of the LBP and a video signal. This controller corresponds to the control board 114 in FIG. 1. A control section 803 controls the operation of the LBP in response to the operation instruction from the controller 114. The control section 803 is electrically connected to the controller 114 through a well-known video interface. An input/output section 804 performs the key input, display (for example, the display of the developer exchange or the like), and the like under the control of the control section 803.

Reference numeral 807 denotes a laser generator; 808 indicates a scanner to scan a laser beam which is irradiated from the laser generator 807; 809 is a photo sensitive drum; 810 is a resist roller; 805 is a detachable developer in which the toner of the first color is set; 806 is also a detachable developer in which the toner of the second color is set; 811 are fixing rollers; and 813 and 814 are reversible conveying rollers.

The recording operation will be simply explained by reference to FIG. 8. When a signal to command the printing (hereinafter, abbreviated as a print signal) is received from the controller 114, the LBP 109 prerotates the drum to uniformly charge the surface of the photo sensitive drum for printing. After the drum surface was uniformly charged, a print paper is fed. After the fed print paper abutted on the resist roller 810, it is conveyed by only a predetermined length by the resist roller 810. Then, the LBP 109 outputs a VSNREQ signal to the controller 114.

In response to the VSNREQ signal, the controller 114 sends a vertical sync signal (hereinafter, abbreviated as a VSYNC) to transmit the image signal to the LBP 109. After an expiration of a predetermined period of time after the VSYNC had been received, the LBP 109 receives the video signal sent from the controller 114 synchronously with a horizontal sync signal (hereinafter, referred to as a BD signal) from the LBP 109 and allows a laser beam modulated in accordance with the video signal to be raster scanned onto the drum 809. At this time, the video signal of the dot images in the page buffer of the first color is used. For example, a positive image exposure is performed as the first image exposure, thereby forming a first electrostatic latent image. This latent image is developed by the first developer 805 using the black toner.

Next, the laser beam modulated in accordance with the video signal of the dot image from the page buffer 113 of the second color is again raster scanned onto the drum 809 developed by the first developer 805, thereby positively exposing the second image and forming the second electrostatic latent image. The second latent image formed by the second image exposure is developed by the second developer 806 using the red toner. The toner images of two colors formed on the photo sensitive drum 809 are transferred onto a recording medium and thereafter, they are fixed on the recording medium by the fixing rollers 811, so that the images are recorded.

Modification of the first embodiment

In the first embodiment, the RAM (random access memory) has been used as the image memory buffer 110. However, an external recording device such as a floppy device can be also used as the buffer 110.

On the other hand, when a non-volatile RAM or the like is used, even after the power supply was stopped, the registered images are held. Therefore, it is more convenient to store the image data (e.g., the logos such as marks of companies and the like) which will be frequently used. Although the LBP has been used in the first embodiment, the invention can be also effectively applied to a multi-color printer or a display device such as a CRT.

Further, in the first embodiment, when the image ID is the same as the image ID which has already been registered, it is not registered. However, if a control instruction to delete the registration or to change the registered content can be input, a degree of freedom in registration of images is further increased.

Effect of the first embodiment

According to the first embodiment explained above, an identifier ID is added as an identifying symbol (denomination) to the image data sent from the host computer and is stored and registered together with the color information. After that, by merely designating the ID, the image data such as a mark of a company or the like whose printing color has been predetermined can be always printed in a constant color. On the other hand, by designating both of the image ID and the color upon printing, the image can be also output in a color different from that upon registration.

Further, by registering images, there is no need to transfer the registered images, so that the transferring time can be saved and the high speed printing can be realized. In addition, the cost of the communicating line can be fairly reduced.

SECOND EMBODIMENT

According to the second embodiment, a plurality of images having predetermined patterns are previously registered and there is provided a mode (two-color printing mode) such that the data which is transmitted from an external apparatus such as a host computer can be printed in the fundamental color (the first color) such as black or the like and the registered images are printed in another color (the second color). Thus, forms, logos, or the like can be printed in color without changing the existing data and the data transmitted from the external apparatus can be printed in the fundamental color of black or the like. On the other hand, although the figure images have been registered as the images in the first embodiment, the images mainly consisting of ruled lines are registered in the second embodiment.

Form

Figure 10:
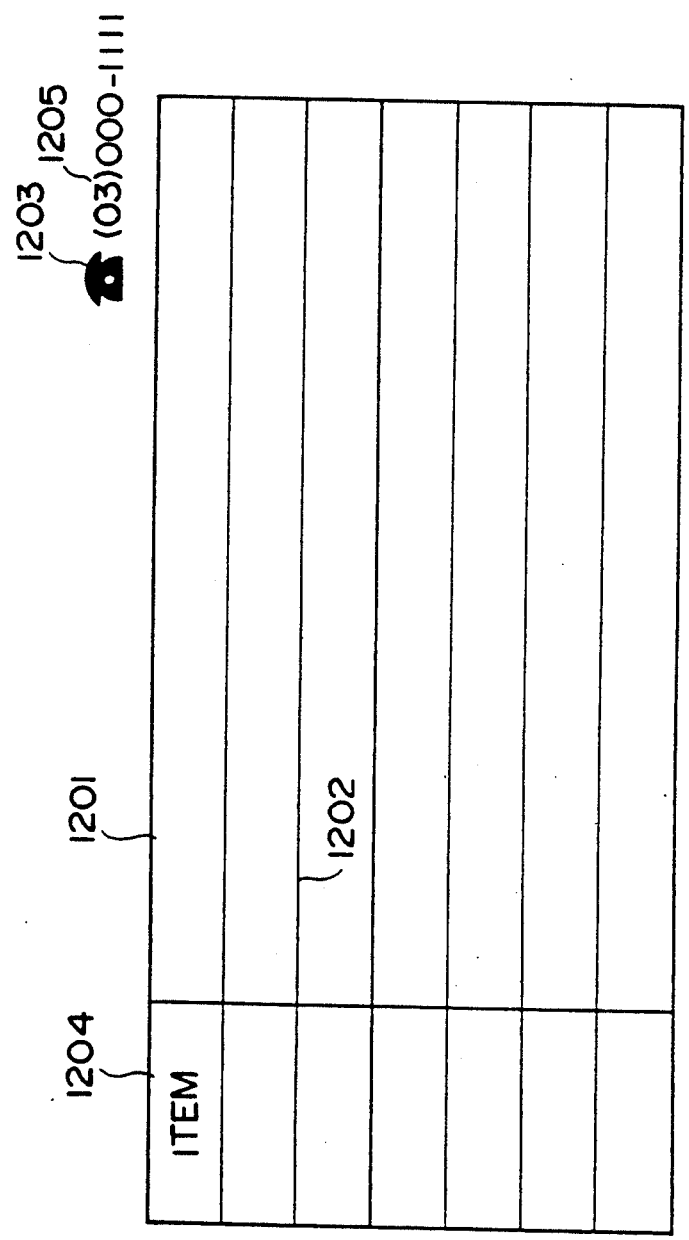
FIGS. 10 and 15 are diagrams showing print examples in the second embodiment.

FIG. 10 is a diagram showing a form as an example of the registered image. In the diagram, reference numeral 1201 denotes a thick ruled line; 1202 indicates a thin ruled line; 1203 is a logo of a telephone mark (in addition to this telephone logo, a trademark, a company symbol or the like is available); and 1204 and 1205 are characters.

In the second embodiment, the form as shown in FIG. 10 and print data of characters transmitted from a host computer 1101 are overlaid and printed out. Although the print data differs every page, the form is the same for all of the pages.

Arrangement

Figure 9:
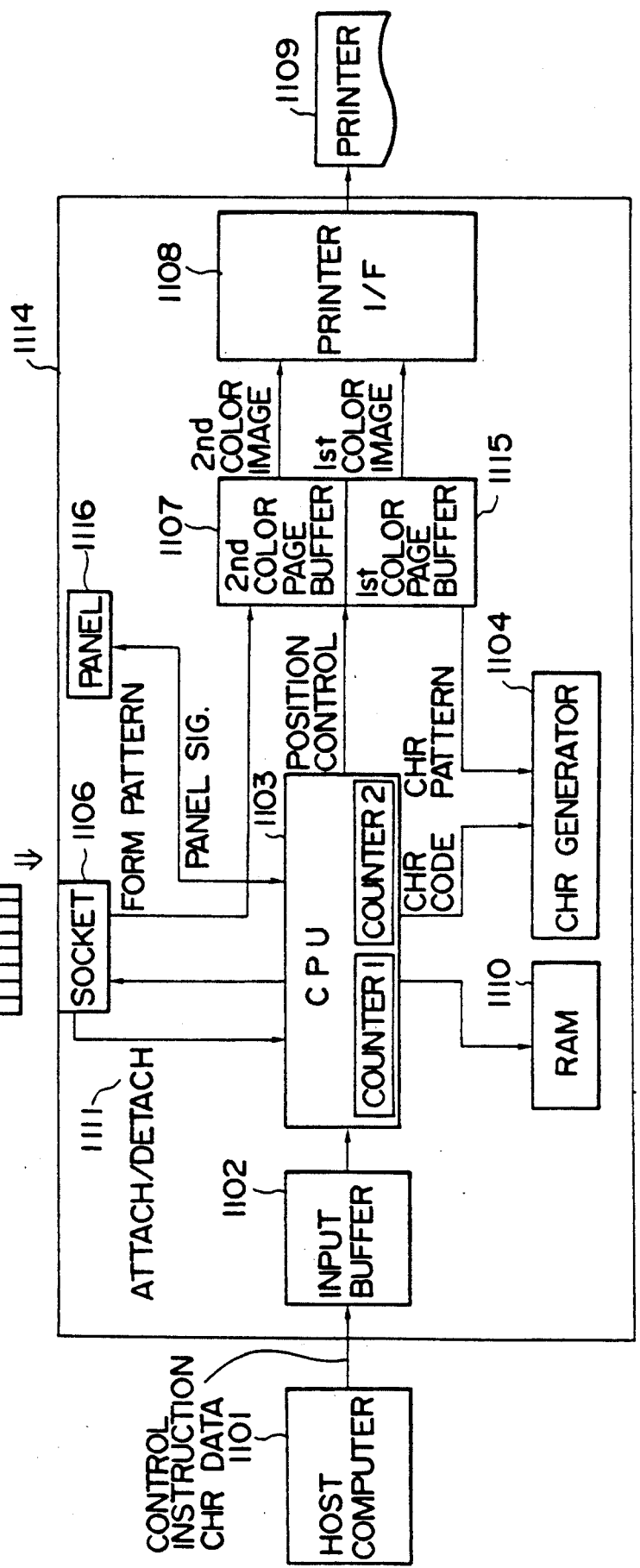
FIG. 9 is a block arrangement diagram of the multi-color image forming apparatus in the second embodiment.

FIG. 9 shows a control circuit diagram to generate form patterns and character patterns in the second embodiment. In this embodiment, the character code data and control instructions which are sent from the host computer 1101 are input and the form patterns and character patterns are recorded by a page printer 1109 such as a laser beam printer or the like. In FIG. 9, reference numeral 1101 denotes the host computer which generates character code data and control instructions; 1102 indicates an input buffer to temporarily store the character code data and control instructions; 1103 is a CPU consisting of a general microprocessor; 1104 is a character generator to generate the character dot patterns in accordance with the character code data which is provided in the apparatus; 1105 is a form pattern generator (corresponding to the image memory buffer 110 in the first embodiment) which is detachable like a cartridge; and 1106 is a socket to connect the form pattern generator 1105 to the apparatus.

Reference numeral 1107 denotes a page buffer for the second color comprises a RAM having a capacity equal to the number of dots of one page; and 1115 is a page buffer for the first color and comprises RAM having a capacity equal to the number of dots of one page. The first color is the fundamental color (e.g., "black") and is used to print the characters or the like. The second color is another color (e.g., "red") different from the fundamental color and is used to print the forms. Colors other than red and black can be also used in place of them.

Reference numeral 1108 denotes a printer interface for interfacing with the printer, for generating a video signal on the basis of the dot information from the output page buffer 1107, and for sending to the printer 1109; 1109 represents the page printer as an output device for actually recording the image by receiving the video signal; 1110 is a RAM (corresponding to the management RAM 105 in the first embodiment) to manage form pattern sets to store information regarding usable form pattern sets (which will be explained hereinafter); 1114 is a CPU board; and 1116 is a panel consisting of a switch or a display device such as an LED or the like.

The relations among the page buffers 1107 and 1115 and the printer 1109 are the same as those in the first embodiment. Namely, the printer 1109 has at least developing systems of two colors (for example, the developers 805 and 806 in FIG. 8). These two developing systems are connected to the page buffers 1107 and 1115 in a one-to-one corresponding relation. For instance, the image expanded in the second color page buffer 1107 is developed by the developer 806. The image in the first color page buffer 1115 is developed by the developer 806. Since the developers 805 and 806 are detachable, by changing the developers, the colors can be changed.

The pattern generator 1105 in FIG. 9 outputs a form pattern which is designated by a control instruction sent from the host computer 1101 or which is manually designated by a key switch (not shown) provided on a panel 1116. This form pattern is overlaid on the character pattern and output to the printer 1109. The foregoing form pattern set indicates a group of a series of data to output the form as shown in FIG. 10. In the second embodiment, one set is stored in the form pattern generator 1105 (the memory such as RAM, ROM, or the like) by a format as shown in, e.g., FIG. 11. Therefore, if it is necessary to output a plurality of kinds of form patterns, it is sufficient to provide a plurality of form pattern sets in the form pattern generator 1105.

Form pattern set

A constitution of the form pattern will be described with reference to FIG. 11. One form pattern set comprises a form pattern set identifier 1301 (1327) to discriminate the kind of form and a form information section 1328. The form information section 1328 consists of a ruled line section, a logo section, a character section, and the like. Reference numeral 1326 denotes an end identifier to indicate the end of the form information section.

The ruled line section has a ruled line identifier 1302 and a ruled line information section 1303. The ruled line information section 1303 stores various information indicative of a number of ruled lines 1304 which are used in one form set, a write start position 1306 of each ruled line, an end position 1307 of each ruled line, and a thickness 1308 of each ruled line. On the other hand, the logo section similarly has a logo section identifier 1310 and a logo information section 1311. The logo information section 1311 stores various information indicative of a number of logos 1312, a write start position 1314 of each logo, a width 1315 of each logo, and a height 1316 of each logo, and an actual logo pattern 1317.

On the other hand, the character section has a character section identifier 1318 and a character information section 1319. The character information section 1319 stores various information indicative of a number of character sets 1320 which are used for one form (that is, one character or a group of a plurality of characters; in the example of FIG. 10, the characters of "ITEM" or the like), a character pattern set identifier address (an address to specify the font of each character set) 1322 of each character set, a number of characters 1323 of each character set, and a write start position 1324 of each character set, and a character code 1325.

The CPU 1103 monitors the attachment or detachment of the form pattern generator 1105 by checking an attach/detach signal 1111. Each time the generator 1105 is attached or detached, the content of the form pattern set management RAM 1110 is rewritten. The form pattern set management table in the RAM 1110 has a structure as shown in FIG. 12.

Form pattern set management table

Figure 11:
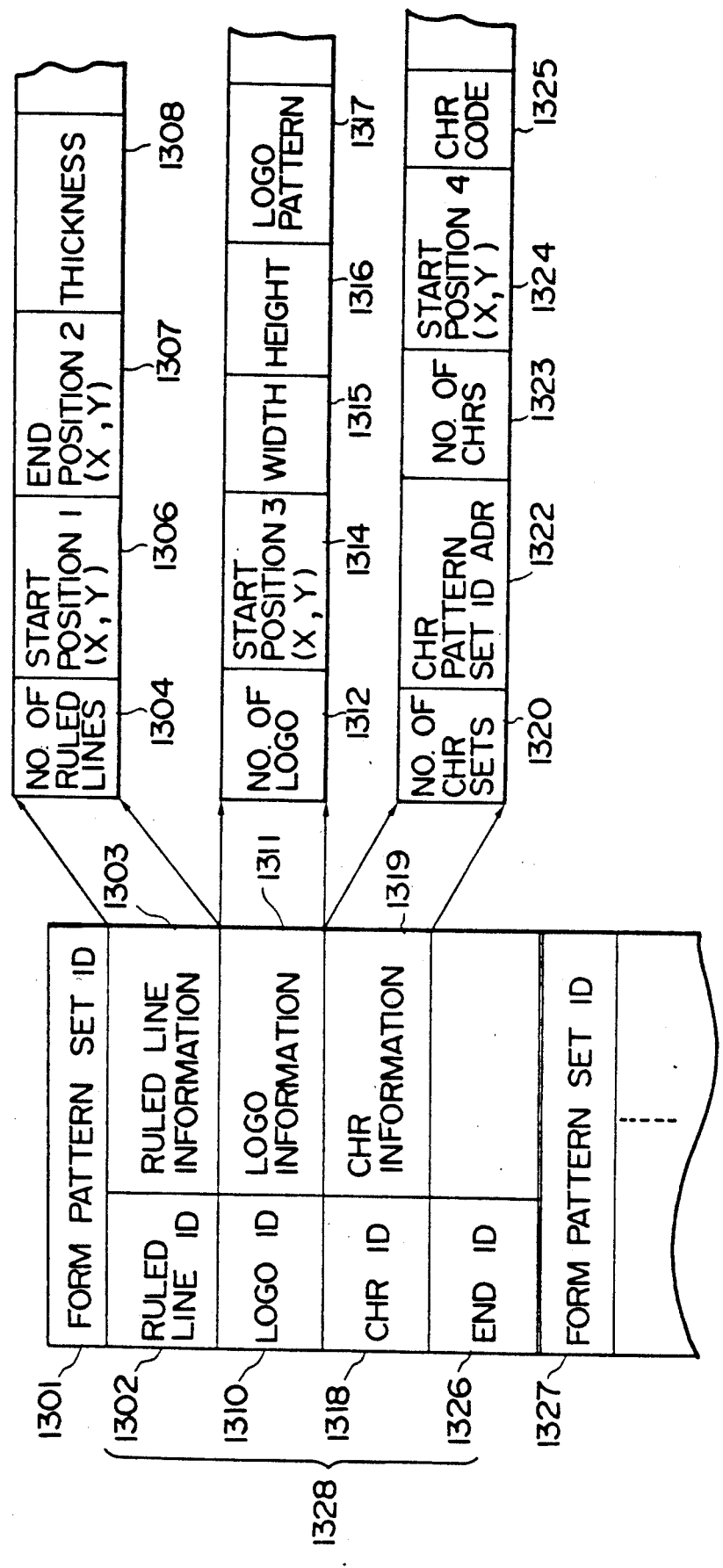
FIG. 11 is a diagram showing a structure of a form pattern.

Reference numeral 1401 denotes an identifier to discriminate a usable form pattern set and is similar to the form pattern set identifier 1301 shown in FIG. 11. Reference numeral 1402 indicates a lead address of a form pattern set and 1403 represents a size of one form pattern set. The form pattern set identifier, form pattern set lead address, and form pattern set size are provided for each form, respectively. If a number of kinds of usable forms exist, the foregoing three kinds of data as many as the number of kinds of usable forms are stored. When the CPU 1103 receives a form pattern set change instruction from the host computer 1101, the CPU 1103 switches the address of the form pattern set and selects the form to be used by reference to the form pattern set management table.

Processing procedure in the second embodiment

Figure 13:
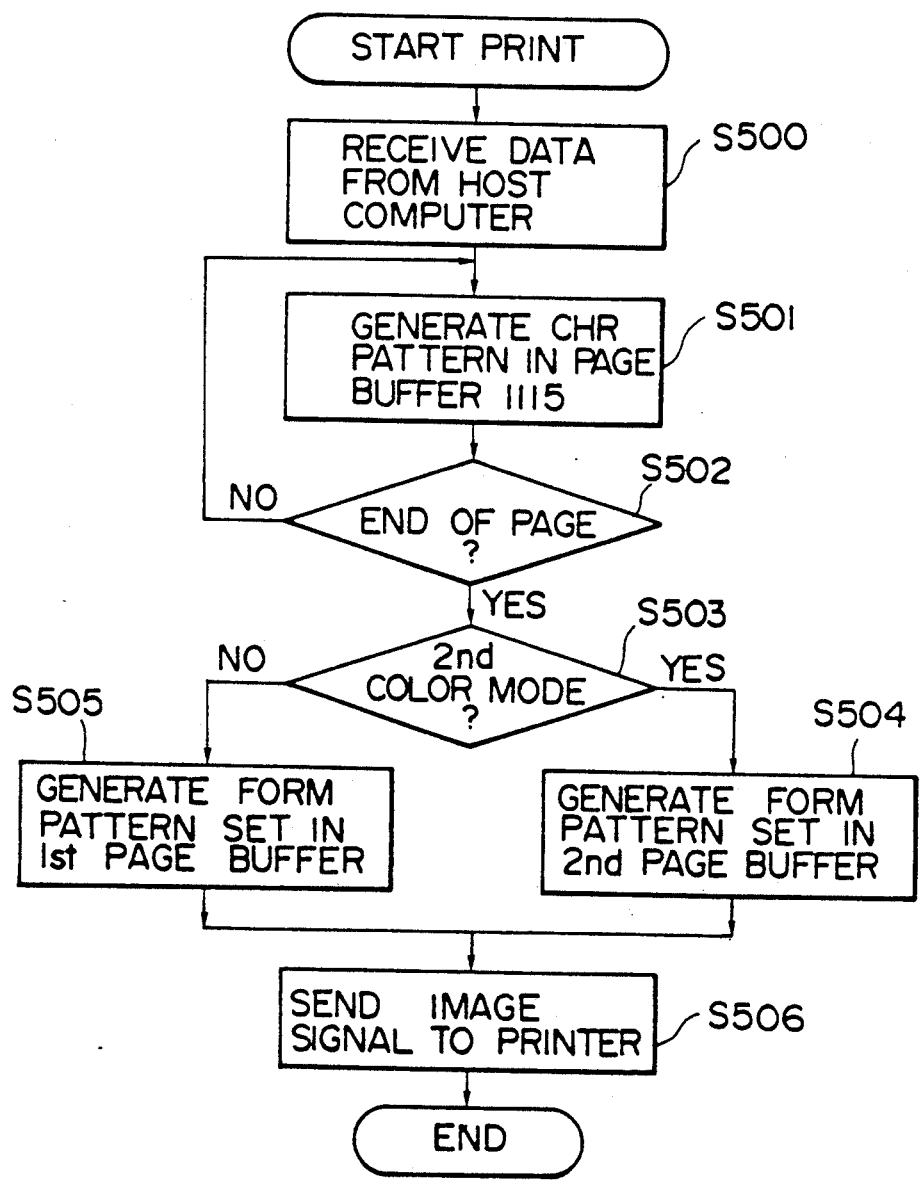
FIGS. 13, 14 (consisting of FIGS. 14A and 14B), and 16 are flowcharts showing processing procedures for the multi-color image forming apparatus in the second embodiment.

An explanation of the operation of the second embodiment will now be given in accordance with a flowchart of FIG. 13. If an operator wants to print the form in the second color, he presses a second color printing mode switch (not shown) on the panel 1116. To indicate the depression of this switch, a display device such as an LED or the like is lit. A second color mode flag (not shown) to keep the depression of this switch is provided.

First, in step S500, data is received from the host computer 1101. In step S501, if the data is the control instruction, it is analyzed and the operation according to this instruction is executed. If the data is the character code, the character pattern is generated at a predetermined position in the first color page buffer 1115 through the character generator 1104. In step S502, a check is made to see if one page has been completed or not. If NO, step S501 is repeated. After completion of the expansion of the dot patterns of the print data of one page, in step S503, a check is made to see if the second color mode flag has been set or not.

If this flag has been set, it is determined that the printing mode is the printing mode using two colors. The form pattern is generated by a method shown in FIG. 14 and expanded in the second color page buffer 1107. If the printing mode is not the two-color printing mode, it is decided that the printing mode is the conventional one-color printing mode. The form pattern is expanded in the first color page buffer 1115 in a manner similar to the data. After completion of the expansion, the image data in the page buffers of the first and second colors are read out and overlaid and transmitted as a video signal to the printer 1109 through the printer interface 1108. The printer 1109 operates in a manner similar to the operations described in conjunction with FIG. 8 in the first embodiment. Thus, the registered image can be printed in color, that is, the images including the registered image can be printed in multi-colors by the manual input from the keyboard panel or the like.

Form pattern expansion

Figure 14A:
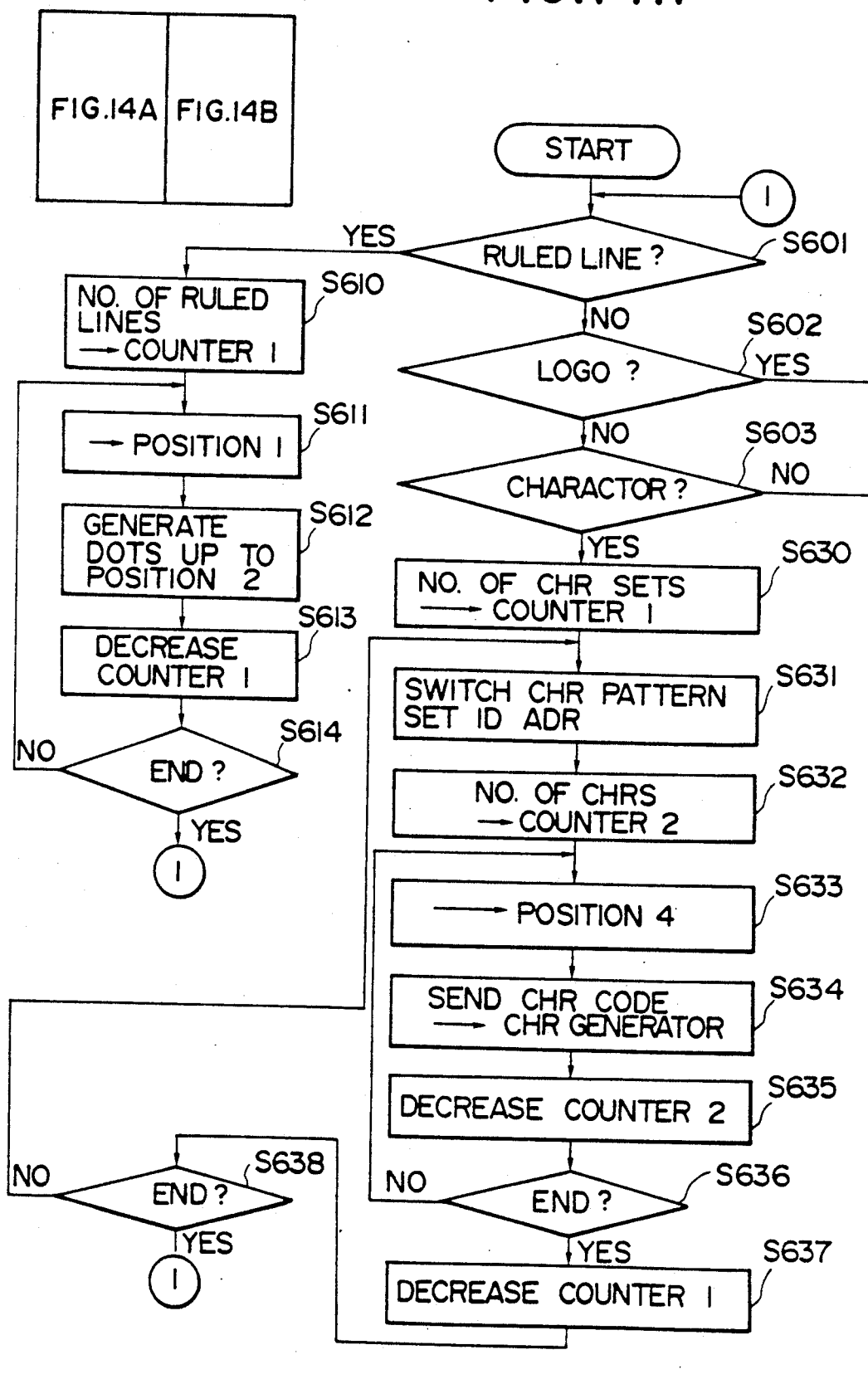
Figure 14B:
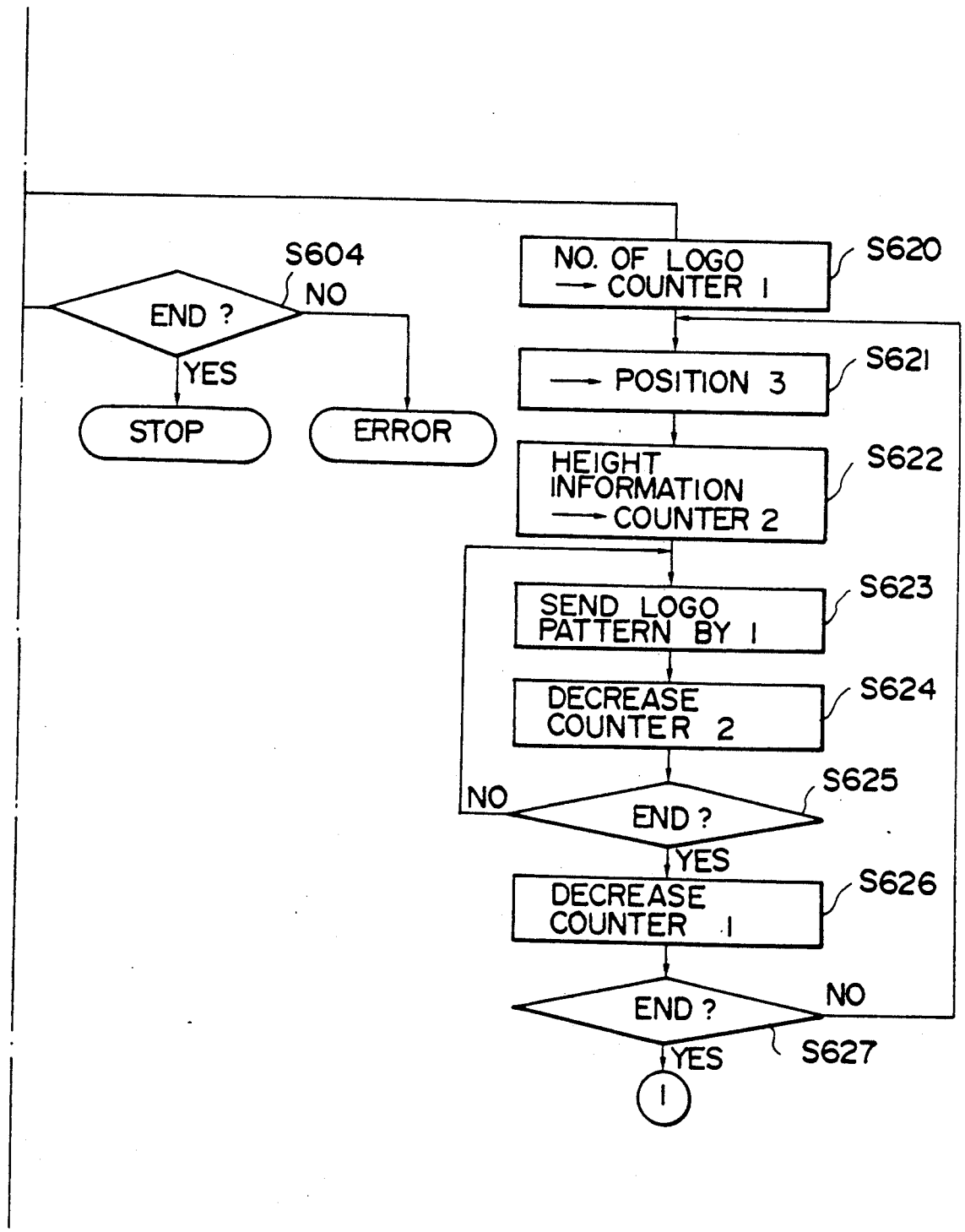
Figure 15:
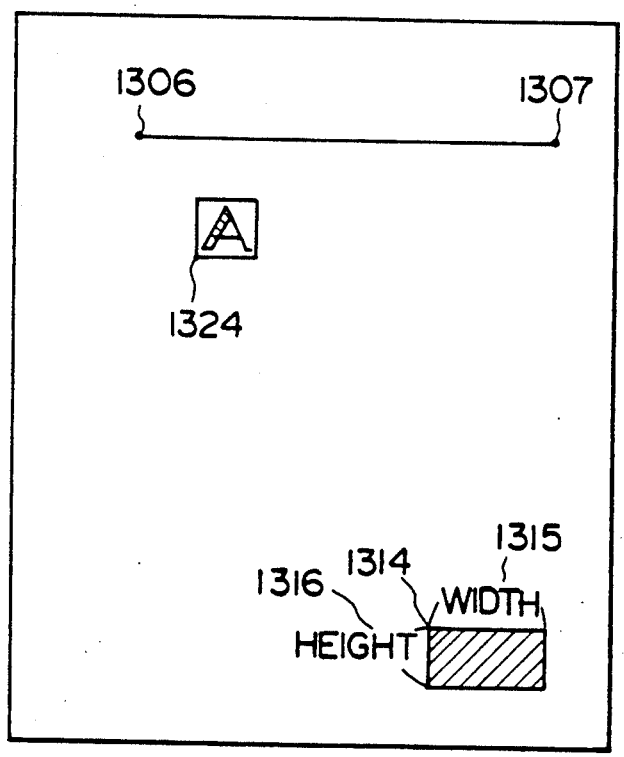

A method of expanding a form pattern will now be described with reference to FIG. 14. FIG. 15 shows an example of a form pattern. The reference numerals in FIG. 15 are made to coincide with those of the fields in the form pattern set in FIG. 11.

After completion of the transfer of the print data in step S502, the host computer 1101 sends control instructions (a selecting instruction of a form and an output instruction of a form) through the input buffer 1102. As shown in FIG. 11, the form comprises a ruled line, logo, character, and the like. The CPU 1103 discriminates the ruled line identifier 1302, logo identifier 1310, and character identifier 1318 in steps S601, S602, and S603 and executes the operations in accordance with these identifiers. When the end identifier 1326 is recognized, the operations are finished.

First, in the case of the ruled line, in step S610, the number of ruled lines 1304 is set into a counter 1 in the CPU 1103. The counter 1 keeps the number of all ruled lines to be written. In the next step S611, the present position (write address of the dot) is moved to the position (refer to FIGS. 11 and 15) which is indicated by the write start position (position 1) 1306 of the ruled line. Thereafter, in step S612, the present position is advanced in accordance with the thickness information 1308 (the number of dots), while the dots are generated until the position indicated by the end position (position 2) 1307 of the ruled line and transmitted to the output page buffer. As explained in conjunction with the flowchart of FIG. 13, the page buffer on the reception side is changed to the first color page buffer 1115 and the second color page buffer 1107 in dependence on the set state of the mode flag. In the next step S613, the count value of the counter 1 is decreased. In step S614, a check is made to see if the writing of all of the ruled lines has been finished or not. If NO, step S611 follows. If YES, the processing routine is returned to step S601.

If the logo is recognized in step S602, the number of logos 1312 is set into the counter 1 in step S620. The present position (the write address of the dot) is moved to the position indicated by the logo write start position 1314 in step S621. The height information 1316 is set into a counter 2 in the CPU 1103 in step S622.

In the next step S623, the pattern of one width is sent from the logo pattern 1317 to the output page buffer on the basis of the width information (the lateral length of logo) 1315. In step S624, the count value of the counter 2 is decreased. In step S625, a check is made to see if the logo pattern has been sent by the amount of the height information 1316 or not. If NO, the processing routine is returned to step S623. On the contrary, if YES, this means that one logo pattern has been sent to the output page buffer. Therefore, the count value of the counter 1 is decreased. A check is made in step S627 to see if the next logo exists or not. If the logo to be transmitted to the page buffer still exists, the processing routine is returned to step S621. If no logo exists, step S610 follows.

If the character data is recognized in step S603, the number of character sets is set into the counter 1 in step S630. In the next step S631, the character pattern set identifier address is switched to select the necessary font. In step S632, the number of characters 1323 is set into the counter 2. Thereafter, in step S633, the present position (the write address of the dot) is moved to the position (refer to FIGS. 11 and 15) indicated by the write start position 1324. Next, the character code is sent to the character generator 1104 in step S634, thereby generating a predetermined character pattern. This character pattern is stored in the output page buffer corresponding to the mode flag. The count value of the counter 2 is decreased in step S635. A check is made in step S636 to see if the character patterns equal to the number of characters stored in the counter 2 have been output or not.

If NO in step S636, the processing routine is returned to step S633. If YES, the count value of the counter 1 is decreased in step S637. In step S638, a check is made to see if another character set to be output exists or not. If YES, step S631 follows and the operations similar to the above are executed. If all of the character sets were output, step S601 follows.

Modification of the second embodiment

In the second embodiment of FIG. 9, the detachable form pattern generator has been assembled in the apparatus. However, the form pattern generator is not limited to the detachable type but may be a form pattern generator such that a form sent from the host computer by a form making control instruction is analyzed by the CPU 1103 and stored into, for example, a RAM or non-volatile RAM in the image forming apparatus with the format of FIG. 11.

On the other hand, as mentioned in the first embodiment, the identifier image ID of the image pattern such as a company mark or the like is added to this image pattern and thereafter, the resultant image pattern is stored and registered. When this image pattern is printed, the image ID is designated. The method whereby the page buffers are selectively used by using the mode flag as shown in the second embodiment can be also applied to an image forming apparatus in which the CPU 1103 searches the image ID management table (corresponding to the RAM 105 in FIG. 1) and if the designated image exists, the image pattern which has been stored and registered is read out and expanded by reference to the image address in the management table.

Figure 16:
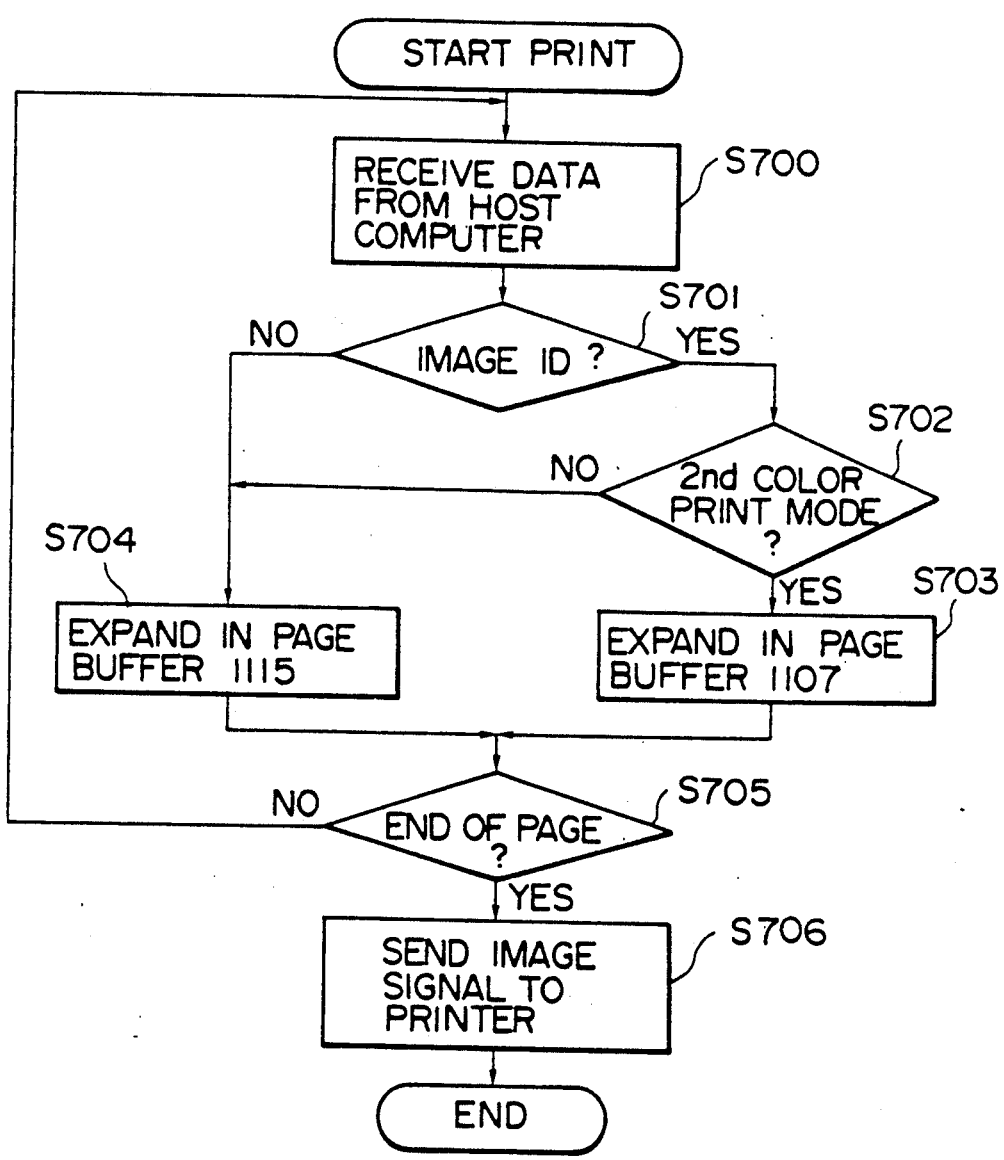

A combination type image forming apparatus such that the first embodiment is applied to the second embodiment will now be explained with reference to a flowchart of FIG. 16. In step S700, the data is received from the host computer 1101. In step S701, a check is made to see if the data is the print data or the image ID.

If the data sent from the host computer is the print data instead of the image ID, the character pattern is expanded in the first color page buffer 1115 at a print position in step S704.

On the other hand, if the data sent from the host computer is the image ID, the image ID is searched for in the management table. If the image ID exists, a check is made in step S702 to see if the printing mode is the two-color printing mode or not. If YES, the image pattern is expanded in the second color page buffer 1107. If NO, the image pattern is expanded in the first color page buffer 1115 of the same color as that of the character pattern.

In step S705, a check is made to see if the page has been completed or not. If NO, the processing routine is returned to step S700 and the data is received. If YES, in step S706, the image data are read out from both of the image buffers and the image signals are sent to the printer 1109 and printed. In this manner, the combination type image forming apparatus of the first and second embodiments operates.

In the second embodiment of FIG. 9, the mode to print the stored form or image pattern in the second color has been designated by the panel switch 1116. However, it can be also designated by a keyboard or the like.

Effects of the second embodiment

As described above, in the image forming apparatus in the second embodiment, the two-color printing mode has been provided and with designating this mode by the panel, keyboard, or the like, the invention can be applied to a printing apparatus of two colors without changing the conventional application software and image data base for a single color. That is, the form, company mark, or the like can be printed in another color different from the color of the characters. On the other hand, when a plurality of one-color image forming apparatuses and two-color image forming apparatuses are connected or the like, it is sufficient to provide one kind of application software. Thus, this method is very advantageous for actual use.

What is claimed is:

1. A multi-color image forming apparatus comprising:

a first memory means for storing a plurality of image data together with corresponding color data;

output means for outputting image data onto an output medium;

designation means for designating desired ones of the plurality of image data stored in said first memory means, and positions on said output medium at which the designated image data are to be output;

a plurality of second memory means each for storing designated image data for a different color;

control means for controlling said output means and said second memory means to output the designated image data at their respective positions and in their different colors on said output medium comparison means for comparing a color in which the image data can be output by said output means with a color corresponding to the color data of the image data designated by said designation means; and alarm means for, when a comparison by said comparison means shows no correspondence, providing an indication to that effect.

2. An apparatus according to claim 1, further comprising input means for inputting the image data together with their corresponding color data in said first memory means.

3. An apparatus according to claim 1, wherein said output means comprises a printer.

4. An apparatus according to claim 1 further comprising a second memory means for storing the positions on said output medium designated by said designation means.

5. A multi-color image forming apparatus, comprising:
   first memory means for storing a plurality of ruled line data;
   second memory means for storing a plurality of character data;
   output means for outputting ruled line data and character data onto an output medium;
   first designation means for designating a desired one of the plurality of ruled line data stored in said first memory means and a position on the output medium at which the designated ruled line data are to be output;
   second designation means for designating a desired one of the plurality of character data stored in said second memory means and a position on the output medium at which the designated character data are to be output;
   third memory means for storing the ruled line data designated by said first designation means;
   fourth memory means for storing the character data designated by said second designation means; and
   control means for controlling said output means to output the ruled line data stored in said third memory means at its designated position on the output medium in a first color, and to output the character data stored in said fourth memory means at its designated position on the output medium in a second color.

6. An apparatus according to claim 5, further comprising additional designation means for designating the first and second colors.

7. An apparatus according to claim 5, wherein said output means comprises a printer.

8. An apparatus according to claim 5, further comprising:
   a fifth memory means for storing the position on the output medium designated by said second designation means; and
   a sixth memory means for storing the position on the output medium designated by said first memory means.

9. A multi-color image forming method, comprising the steps of:
   designating character data to be read from a first character data memory and a position on an output medium at which the designated character data are to be output;
   designating ruled line data to be read from a first ruled line data memory and a position on the output medium at which the designated ruled line data are to be output;
   storing the character data designated in the first designating step in a second character data memory;
   storing the ruled line data designated in the second designating step in a second ruled line data memory; and
   outputting the character data stored in said second character data memory at its designated position on the output medium in a first color, and for outputting the ruled line data stored in said second ruled line data memory at its designated position on the output medium in a second color.

* * * * *

UNITED STATES PATENT AND TRADEMARK OFFICE
CERTIFICATE OF CORRECTION

PATENT NO. : 5,045,967  
DATED : September 3, 1991  
INVENTOR(S) : MASARU IGARASHI Page 1 of 2

It is certified that error appears in the above-identified patent and that said Letters Patent is hereby corrected as shown below:

COLUMN 2:

Line 43, "apparatus" should read --apparatus,--.

COLUMN 3:

Line 57, "of" should read --in--; and  
Line 59, "as forms" read --in the form--.

COLUMN 6:

Line 48, "registeres" should read --registers--.

COLUMN 8:

Line 16, "simply" should be deleted.

COLUMN 9:

Line 24, "the" should be deleted.

UNITED STATES PATENT AND TRADEMARK OFFICE
CERTIFICATE OF CORRECTION

PATENT NO. : 5,045,967
DATED : September 3, 1991
INVENTOR(S) : MASARU IGARASHI

It is certified that error appears in the above-identified patent and that said Letters Patent is hereby corrected as shown below:

COLUMN 10:

Line 14, "comprises RAM" should read --comprises a RAM--.

COLUMN 14:

Line 35, "with" should read --by-- and "by" should read --with--; and
Line 63, "medium" should read --medium;--.

COLUMN 15:

Line 10, "claim 1" should read --claim 1,--.

Signed and Sealed this

Thirteenth Day of April, 1993

Attest:

STEPHEN G. KUNIN

Attesting Officer     Acting Commissioner of Patents and Trademarks